US 6,502,016 B1

(12) United States Patent
Ozaki et al.

(10) Patent No.: US 6,502,016 B1
(45) Date of Patent: Dec. 31, 2002

(54) DEVICE FOR GUIDING VEHICLE

(75) Inventors: Tomonori Ozaki, Hiratsuka (JP); Masato Kageyama, Oyama (JP)

(73) Assignee: Komatsu, Ltd., Tokyo (JP)

( * ) Notice: Subject to any disclaimer, the term of this patent is extended or adjusted under 35 U.S.C. 154(b) by 0 days.

(21) Appl. No.: 09/831,105
(22) PCT Filed: Oct. 29, 1999
(86) PCT No.: PCT/JP99/06063
§ 371 (c)(1),
(2), (4) Date: May 4, 2001
(87) PCT Pub. No.: WO00/26735
PCT Pub. Date: May 11, 2000

(30) Foreign Application Priority Data

Nov. 4, 1998 (JP) .............................. 10-313275

(51) Int. Cl.[7] .............................. G05D 1/00; G06F 7/00
(52) U.S. Cl. .......................... 701/23; 701/200; 701/201; 73/178 R
(58) Field of Search ............................. 701/23, 25, 200, 701/206, 207, 201; 73/178 R; 340/988

(56) References Cited

U.S. PATENT DOCUMENTS 4,939,661 A * 7/1990 Barker et al. ................ 342/452
5,144,685 A * 9/1992 Nasar et al. .................. 348/119
6,002,981 A * 12/1999 Kreft ........................... 340/990
6,370,126 B1 * 4/2002 De Baere et al. ............ 370/316

FOREIGN PATENT DOCUMENTS

| JP | 63200207 | 8/1988 |
| JP | 63316218 | 12/1988 |
| JP | 2-81210 | 3/1990 |
| JP | 3286210 | 12/1991 |
| JP | 5297942 | 11/1993 |

* cited by examiner

Primary Examiner—William A. Cuchlinski, Jr.
Assistant Examiner—Olga Hernandez
(74) Attorney, Agent, or Firm—Varndell & Varndell, PLLC

(57) ABSTRACT

Position data of target points (26', 26', . . . ) in a target area (21) is generated based on the position data of the target area (21) (position data of a borderline (20)) inputted to area data input device (3). A vehicle (13) is sequentially guided to travel through the target positions (26', 26', . . . ) in the target area (21) while being given the position data of the target points (26', 26', . . . ). Not by a conventional method such as a teaching method, a travel course to target points in a target area is easily created with little man-hour in a short time when an earth unloading area (target area) which the vehicle is to reach is given, thereby enhancing the work efficiency of creating a travel course. Further, target earth unloading points in an earth unloading area are arranged uniformly and densely, and consequently the efficiencies of an earth unloading work and a leveling work are enhanced.

14 Claims, 13 Drawing Sheets

CONCEPTUAL DIAGRAM EXEMPLIFYING THE SHAPE OF EARTH UNLOADING AREA

CONCEPTUAL DIAGRAM EXEMPLIFYING
THE SHAPE OF EARTH UNLOADING AREA

CONCEPTUAL DIAGRAM EXEMPLIFYING
EARTH UNLOADING POINTS TO BE GENERATED

CONCEPTUAL DIAGRAM EXEMPLIFYING RELATIVE POSITIONS OF TARGET EARTH UNLOADING POINTS TO BE GENERATED
FIG.6(a)
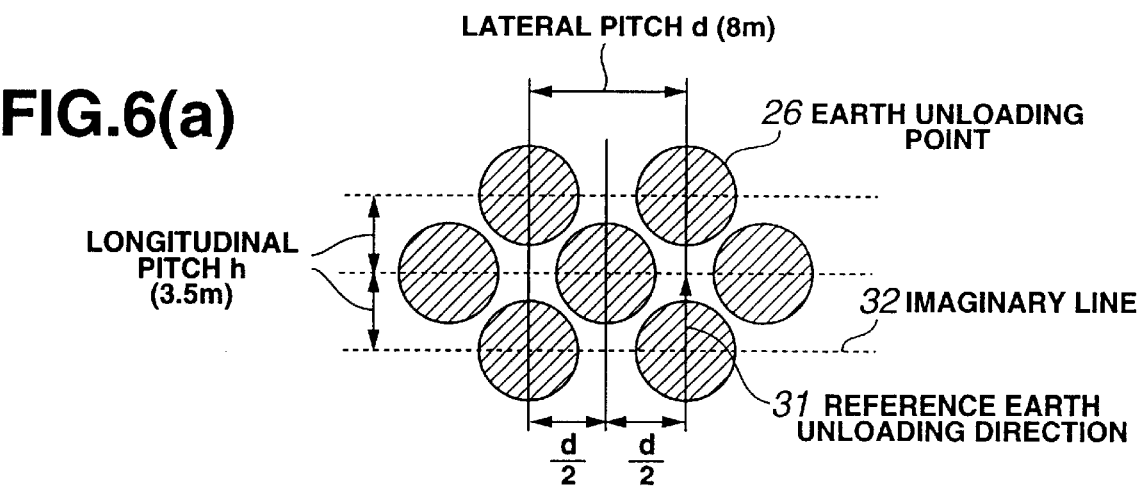
FIG.6(b)
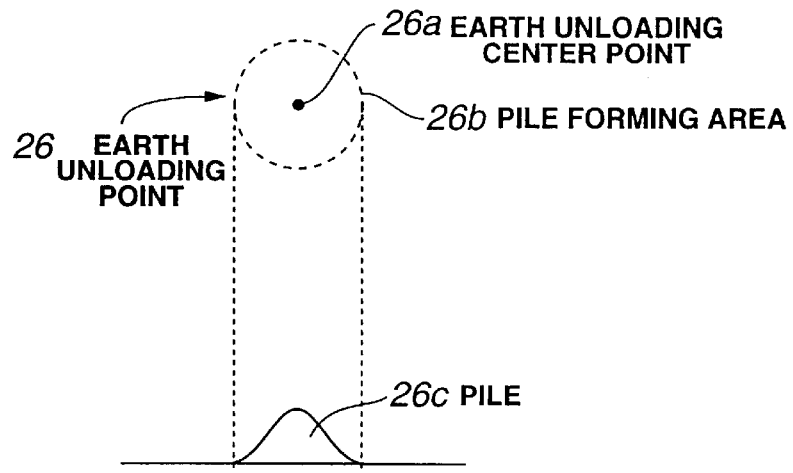
FIG.6(c)

DEVICE FOR GUIDING VEHICLE

TECHNICAL FIELD

The present invention relates to a vehicle guidance device, and more particularly to a device which is suitably applied when an unmanned off-road dump truck is guided to travel on a work site such as a mine.

BACKGROUND ART

In a mine of a large area, an unmanned vehicle guidance traveling system for guiding to travel an unmanned vehicle such as an unmanned off-road dump truck is becoming commercially practical in order to liberate from hard work, to reduce a production cost and to decrease a fuel cost or the like.

The above unmanned vehicle is provided with a position measuring device for measuring its traveling position by GPS (global positioning system). Meanwhile, a monitor station which monitors a plurality of unmanned vehicles has position data of traveling courses along which the unmanned vehicles shall travel determined and stored by measuring a work site or by teaching. Upon receiving the position data of the traveling courses from the monitor station by radio communications or the like, the unmanned vehicle measures its own position (and direction) by the position measuring device mounted on it, compares the measured current position with its sequential positions on the traveling course and controls to steer the vehicle so to sequentially reach the respective positions on the traveling course.

As a method of obtaining the position data of a traveling course, for example a teaching method, which stores the traveling route of a teaching vehicle which is actually traveled, is commonly used.

The teaching vehicle actually travels to obtain position data of a route from a travel starting point to a target point or a route from a travel starting point to a travel termination point via a target point so that the unmanned vehicle shall pass through the target point. There is also method of generating a traveling course from position data of a target position obtained by teaching only the position data of the target position.

As shown FIG. 12, this mine has earth unloading area 21 where unmanned vehicle 13 works to carry and unload earth and sand, namely performs an earth unloading work. Position data of traveling course 27 having target earth unloading points 26' in the earth unloading area 21 are obtained by the teaching method. When the target earth unloading points 26' in the earth unloading area 21 are not many (about 10 points), the frequency of the teaching work can be little, and time and man-hour required to generate the traveling course can be little.

Actually, the earth unloading area 21 in a large-area mine or the like is vast, and the target earth loading points 26' in the earth unloading area 21 are so many of about hundreds of points. Therefore, to obtain the position data of the traveling course 27 for each of the multiple earth unloading points 26', 26' . . . in the earth unloading area 21 by the teaching work, the frequency of teaching work becomes many, and time and man-hour required for generation of the traveling course become huge. Therefore, work efficiency is heavily degraded.

But, conventionally known publications do not describe a technology that time and man-hour for generating a traveling course are reduced so to enhance work efficiency where an earth unloading area has many target earth unloading points and the traveling course is generated so to pass through the target earth unloading points.

For example, Japanese Patent Application Laid-Open No. 10-187238 descries an invention which enhances the work efficiency by controlling the order that a vehicle accesses a plurality of earth unloading points. But, it does not disclose the enhancement of the work efficiency by easily preparing the traveling course to the multiple target earth unloading points in the earth unloading area.

Besides, it is necessary to dispose the target earth unloading points 26' uniformly and closely as much as possible within the earth unloading area 21 in order to efficiently perform the earth unloading work and subsequent leveling work. But, it is practically hard to obtain the position data of the target earth unloading points 26' by a manual teaching work so that the target earth unloading points 26' are uniformly and closely arranged as much as possible within the earth unloading area 21.

The method of obtaining the position data of the target points also includes a method of receiving position data from a vehicle such as a wheel loader located at a target point in addition to the teaching method. But, even such a method cannot receive position data of the target earth unloading points 26' from the vehicle if the vehicle such as a wheel loader is not present in the earth unloading area 21.

The present invention was achieved in view of the aforesaid circumstances. And, it is an object of the invention to enhance work efficiency in generating a traveling course by enabling to readily generate the traveling course for each of a plurality of target points in a target area without requiring much time and man-hour when an earth unloading area (target area) to which the vehicle has to reach is provided without depending on a conventional method such as the teaching method. Besides, it is an object of the invention to enhance work efficiency of earth unloading and land-leveling works by uniformly and closely forming a plurality of target earth unloading points in the earth unloading area.

DISCLOSURE OF THE INVENTION

A first aspect of the invention is a vehicle guiding device which receives position data of target points where a vehicle is to reach and guides the vehicle to travel to the target points according to the position data of the target points, the device comprising:

area data input means for inputting position data of a borderline of a target area where the vehicle is to reach;

target point generating means for generating position data of a plurality of target points in the target area according to the position data of the target area which are inputted to the area data input means; and guidance means for sequentially guiding the vehicle to travel to the plurality of target points in the target area by sequentially giving the position data of the plurality of target points generated by the target point generating means.

According to the first aspect of the invention, the position data of the plurality of target points 27', 26' . . . in the target area 21 are generated according to the position data (position data of the borderline 20) of the target area 21 which are entered the area data input means 3 as shown in FIG. 1, FIG. 5 and FIG. 7. And, the generated position data of the plurality of target points 26', 26' . . . are sequentially given to sequentially guide the vehicle 13 to travel to the plurality of target points 26', 26' . . . in the target area 21.

Thus, according to the first aspect of the invention, the position data of the plurality of target points 26' . . . are obtained automatically without depending on a conventional method such as the teaching method. In other words, when the target area 21 to which the vehicle 13 has to reach is given, the plurality of target points 26', 26' . . . are automatically generated in the target area 21. Therefore, traveling course 27 can be generated easily without requiring much time and man-hour compared with the conventional teaching method. As a result, the efficiency of the traveling course generation work is improved remarkably.

A second aspect of the invention is directed to the first aspect of the invention, wherein the target area is an earth unloading area where earth and sand are unloaded.

According to the second aspect of the invention, the target area is the earth unloading area 21 where earth and sand are unloaded as shown in FIG. 12.

A third aspect of the invention is directed to the second aspect of the invention, wherein the target point generating means arranges a plurality of target earth unloading points at equal intervals in the earth unloading area according to the position data of the borderline of the earth unloading area and data indicating an arrangement interval of the target earth unloading points.

According to the third aspect of the invention, as shown in FIG. 7, the plurality of target earth unloading points 26', 26' . . . are laterally arranged by pitch d of equal intervals and longitudinally arranged by pitch h of equal intervals according to the position data of the borderline 20 of the earth unloading area 21 and data (template 33) indicating arrangement intervals d, h of the target earth unloading points 26' so that they are arranged in the maximum number in the earth unloading area 21. Thus, the earth unloading work can be performed efficiently because the target earth unloading points 26' can be arranged uniformly and closely. And, piles 26c are formed uniformly and closely in the earth unloading area 21. Therefore, where a leveling work is performed after the earth unloading work, the piles 26c can be leveled uniformly, and the leveling work can be performed efficiently.

A fourth aspect of the invention is a vehicle guidance device which is provided with vehicle position measuring means for measuring a current position of an own vehicle, receives position data of target points where the vehicle is to reach, generates data of a traveling course which is routed to pass through the target points according to the position data of the target points, and compares the current vehicle position measured by the vehicle position measuring means with a position on the generated traveling course to guide the own vehicle to travel along the traveling course, the device comprising:

area data input means for inputting position data of a borderline of a target area where the vehicle is to reach;

target point generating means for generating position data of a plurality of target points in the target area according to the position data of the target area which are inputted to the area data input means;

traveling course generating means for generating for each of the target points data of a traveling course, which is routed from an entrance of the target area to one of the plurality of target points in the target area and to an exit of the target area, according to the position data of the plurality of target points in the target area generated by the target point generating means; and guidance means for sequentially guiding the vehicle to travel along each of the traveling course generated by the traveling course generating means.

According to the fourth aspect of the invention, the position data of the plurality of target points 26', 26' . . . in the target area 21 are generated according to the position data (position data of the borderline 20) of the target area 21 which are entered the area data input means 3 as shown in FIG. 1, FIG. 5 and FIG. 7. And, according to the generated position data of the plurality of target points 26', 26' . . . , the position data of the traveling course 27 routed from the entrance of the target area 21 to reach one of the plurality of target points 26', 26' . . . in the target area 21 and to the exit of the target area 21 are generated for each of the target points 26'. The vehicle 13 is guided to travel along the respective generated traveling courses 27, 27 . . . .

Thus, according to the fourth aspect of the invention, when the target area 21 to which the vehicle 13 has to reach is given without depending on a conventional method such as the teaching method, the plurality of target points 26', 26' . . . are automatically generated in the target area 21, and the traveling curse 27 is generated for each of the target points 26'. Therefore, the traveling course 27 can be generated easily without requiring such time and man-hour as the conventional teaching method does. As a result, the efficiency of traveling course generating work is improved remarkably.

A fifth aspect of the invention is directed to the fourth aspect of the invention, wherein the target area is an earth unloading area where earth and sand are unloaded.

The fifth aspect of the invention is applied where the earth unloading work is performed in the earth unloading area in the same way as the second aspect of the invention.

A sixth aspect of the invention is directed to the fifth aspect of the invention, wherein the target point generating means arranges the plurality of target earth unloading points at equal intervals in the earth unloading area according to the position data of the borderline of the earth unloading area and data indicating the arrangement intervals of the target earth unloading points.

According to the sixth aspect of the invention, the same effect as the third aspect of the invention can be obtained.

A seventh aspect of the invention is directed to the fourth aspect of the invention, wherein:

the area data input means comprises means for inputting position data of the entrance point and the exit point of the target area, and the traveling course generating means generates for each of the target points data of the traveling course, which is routed from the entrance point of the target area to one of the plurality of target points in the target area and to the exit point of the target area, according to the position data of the entrance point and exit point of the target area.

According to the seventh aspect of the invention, the position data of the traveling course 27, which is routed to pass the entrance point 22 of the target area 21 to reach one of the plurality of target points 26', 26' . . . in the target area 21 and to pass the exit point 23 of the target area 21, are generated for each of the target points 26' according to the position data of the entrance point 22 and the exit point 23 of the target area 21 as shown in FIG. 13.

An eighth aspect of the invention is a vehicle guidance device which is provided with vehicle position measuring means for measuring a current position of an own vehicle, receives position data of target points where the vehicle is to reach, generates data of a traveling course routed to pass through the target points according to the position data of the target points, and compares the current vehicle position measured by the vehicle position measuring means with a position on the generated traveling course to guide the own vehicle to travel along the traveling course, the device comprising:

area data input means for inputting position data of a borderline of a target area where the vehicle is to reach;

untravelable area data input means for inputting position data of an untravelable area indicating an area where the vehicle cannot travel;

target point generating means for generating position data of a plurality of target points in the target area according to the position data of the target area which are inputted to the area data input means;

traveling course generating means for generating for each of the target points data of a traveling course, which is routed from an entrance of the target area to reach one of the plurality of target points in the target area and to an exit of the target area so not to pass the untravelable area, according to the position data of the plurality of target points in the target area generated by the target point generating means and the position data of the untravelable area which are inputted to the untravelable area data input means; and guidance means for sequentially guiding the vehicle to travel along each of the traveling courses generated by the traveling course generating means.

According to the eighth aspect of the invention, the same effect as the fourth aspect of the invention can be obtained.

Besides, according to the eighth aspect of the invention, the position data of the traveling course 27 routed to pass from the entrance of the target area 21 to reach one of the plurality of target points 26', 26' . . . in the target area 21 and to the exit of the target area 21 so not to pass the untravelable area (other than the travelable area 24) are generated for each of the respective target points 26' according to the position data of the plurality of target points 26', 26' . . . in the target area 21 and the position data (position data of travelable area 24) of the untravelable area as shown in FIG. 11.

According to the eighth aspect of the invention, even if the target earth unloading point 26' is in the neighborhood of the borderline 20, the traveling course 27 is corrected so that an earth unloading direction is changed from 31 to 31a to prevent the vehicle 13 from passing any area other than the travelable area 24. Thus, the vehicle 13 can be prevented from interfering with a wall or falling over a cliff. Therefore, the vehicle 13 can be guided safely to travel according to the eighth aspect of the invention.

A ninth aspect of the invention is directed to the eighth aspect of the invention, wherein the target area is an earth unloading area where earth and sand are unloaded.

The ninth aspect of the invention is applied for the earth unloading work in the earth unloading area in the same way as the second aspect of the invention.

A tenth aspect of the invention is directed to the ninth aspect of the invention, wherein the target point generating means arranges the plurality of target earth unloading points at equal intervals in the earth unloading area according to the position data of the borderline of the earth unloading area and the data indicating an arrangement interval of the target earth unloading points.

According the tenth aspect of the invention, the same effect as the third aspect of the invention can be obtained.

An eleventh aspect of the invention is directed to the eighth aspect of the invention, wherein:

the untravelable area data input means comprises means for inputting the position data of an entrance point and an exit point of the target area, and the traveling course generating means generates for each of the target points data of the traveling course, which is routed from the entrance point of the target area to reach one of the plurality of target points in the target area and to the exit point of the target area so not to pass the untravelable area, according to the position data of the entrance point and the exit point of the target area.

According to the eleventh aspect of the invention, the traveling course 27 is generated according to the position data of the entrance point 22 and the exit point 23 of the target area 21 in the same way as the seventh aspect of the invention.

A twelfth aspect of the invention is a vehicle guidance device which is provided with vehicle position measuring means for measuring a current position of an own vehicle, receives position data of target points where the vehicle is to reach, generates data of a traveling course routed to pass through the target points according to the position data of the target points, compares the current vehicle position measured by the vehicle position measuring means with a position on the generated traveling course to guide the own vehicle to travel along the traveling course, the device comprising:

earth unloading area data input means for inputting position data of a borderline of the earth unloading area where earth and sand are to be unloaded;

target point generating means for generating position data of a plurality of target earth unloading points in the earth unloading area according to position data of the earth unloading area which are inputted to the earth unloading area data input means;

traveling course generating means for sequentially generating for each of the target earth unloading points data of the traveling course, which is routed to pass an entrance of the earth unloading area to reach a first target earth unloading point and to pass an exit of the earth unloading area so not to pass the target earth unloading points on the previously generated traveling course, according to the position data of the plurality of target earth unloading points in the earth unloading area generated by the target point generating means; and guidance means for guiding the vehicle to travel along the traveling course sequentially generated by the traveling course generating means.

The same effect as the fourth aspect of the invention can be obtained according to the twelfth aspect of the invention.

According to the twelfth aspect of the invention, as shown in FIG. 13, the position data of the traveling course 27 routed to pass the entrance of the earth unloading area 21 to reach the first target earth unloading point 26' and to pass the exit of the earth unloading area 21 so not to pass the target earth unloading point 26" (point where pile 26c is formed) on the previously generated traveling course are generated sequentially for each of the respective target earth unloading points 26' according to the position data of the plurality of target earth unloading points 26', 26' . . . in the earth unloading area 21.

According to the twelfth aspect of the invention, the traveling course 27 is changed from a broken line to a solid line so not to pass the target earth unloading point 26" (point where the pile 26c is formed) on the previously generated traveling course. Thus, the vehicle 13 does not interfere with the formed pile 26c (earth unloading point 26"). Thus, the vehicle 13 is prevented from colliding with the pile 26c possibly resulting in a serious accident. And, the vehicle 13 can be guided to safely travel according to the twelfth aspect of the invention.

A thirteenth aspect of the invention is directed to the twelfth aspect of the invention, wherein the target point generating means arranges the plurality of target earth unloading points at equal intervals in the earth unloading area according to the position data of the borderline of the earth unloading area and the data indicating the arrangement intervals of the target earth unloading points.

The same effect as the third aspect of the invention can be obtained according to the thirteenth aspect of the invention.

A fourteenth aspect of the invention is directed to the twelfth aspect of the invention, wherein:

the earth unloading area data input means comprises means for inputting position data of an entrance point and an exit point of the earth unloading area; and the traveling course generating means generates sequentially for each of the target points data of the traveling course, which is routed to pass the entrance point of the earth unloading area to reach the first target earth unloading point in the earth unloading area and to pass the exit point of the earth unloading area so not to pass the target earth unloading points on the previously generated traveling course, according to the position data of the entrance point and the exit point of the earth unloading area.

According to the fourteenth aspect of the invention, the traveling course 27 is generated according to the position data of the entrance point 22 and the exit point 23 of the target area 21 in the same way as the seventh aspect of the invention.

BRIEF DESCRIPTION OF THE DRAWINGS

FIG. 6(a) is a diagram schematically showing a relative positional relation among earth unloading points to be generated, FIG. 6(c) is a side view of a pile, and FIG. 6(b) is a top view showing a relation between a pile and an earth unloading point;

BEST MODE FOR CARRYING OUT THE INVENTION

Embodiments of the vehicle guidance device to which the present invention pertains will be described with reference to the accompanying drawings.

Figure 12:
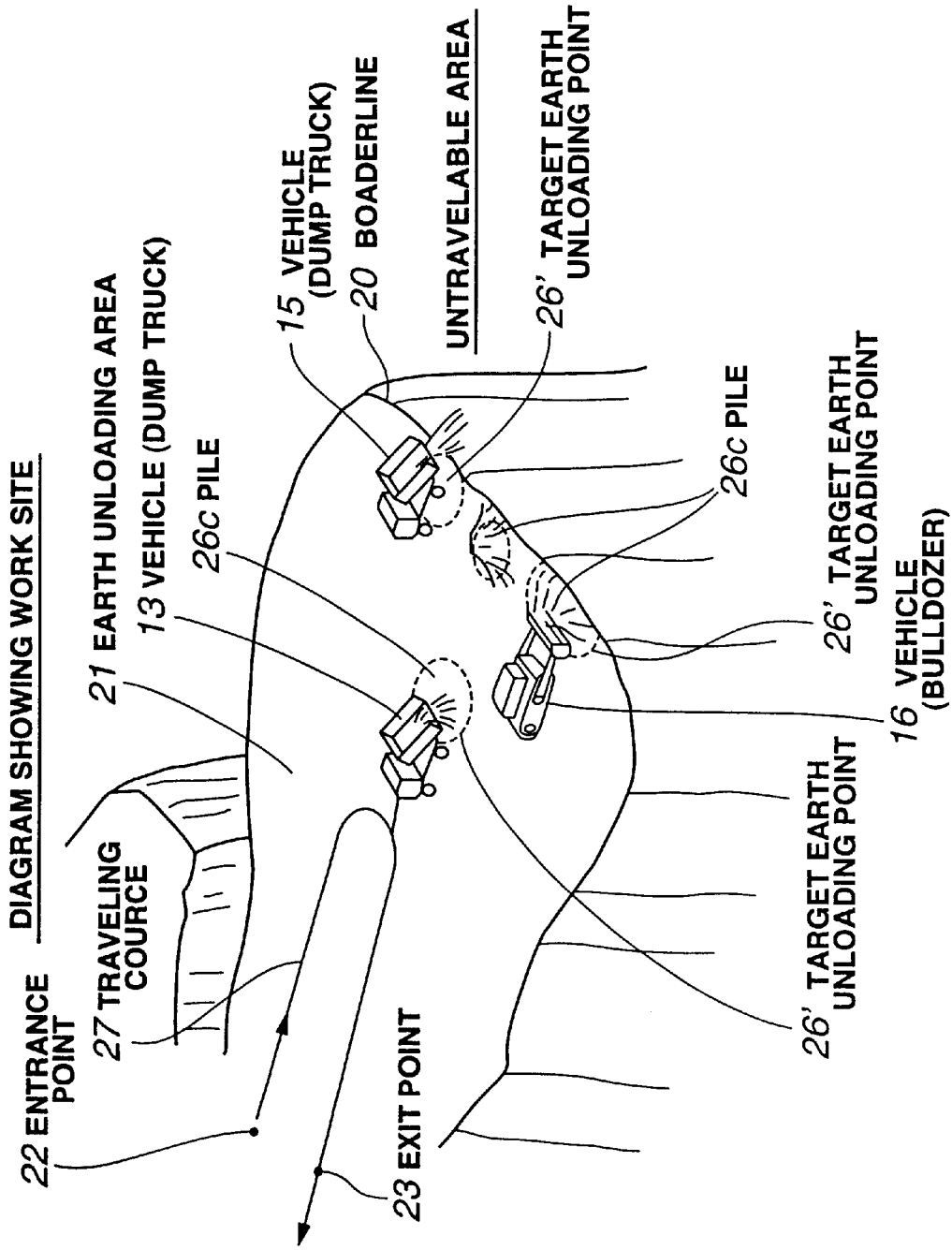
FIG. 12 is a diagram showing an example of the geographical features in the vicinity of an earth unloading area on a work site.

FIG. 12 shows a state of the work site of an embodiment. It is assumed in this embodiment that vehicle 13 such as an off-road dump truck loaded with earth and sand is guided to travel along the traveling course 27 to reach the target earth unloading point 26' in the earth unloading area 21 on a large-area mine site and to unload the earth and sand at the target earth unloading point 26'. The invention may also be applied where vehicle 16 such as a bulldozer is guided to travel to the target earth unloading point 26' in the earth unloading area 21 on the large-area mine site and to unload earth and sand at the target earth unloading point 26'.

The unmanned off-road dump truck 13 will be typically described as the vehicle below. It is to be understood that the invention is not limited to the unmanned vehicles but can also be applied to a manned vehicle which man is on board.

Figure 1:
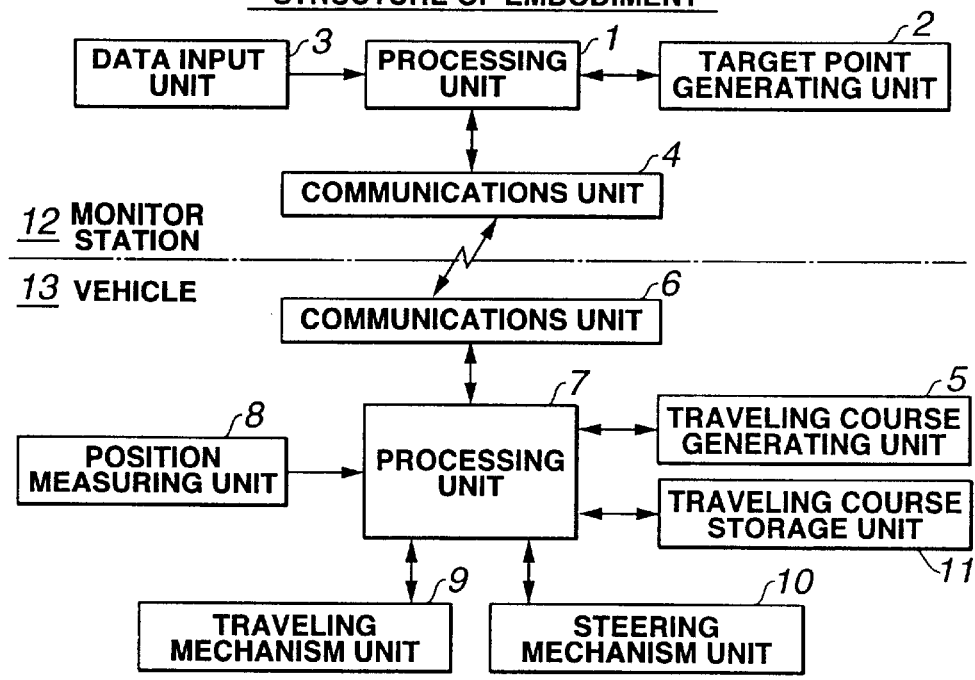
FIG. 1 is a block diagram showing a structure of the unmanned vehicle guidance running system of an embodiment.

FIG. 1 is a block diagram showing the vehicle monitoring system of the embodiment.

Monitor station 12 for controlling and monitoring many vehicles 13, 13 . . . is disposed at a work site. The monitor station 12 is provided with processing unit 1, target point generating unit 2, data input unit 3 and communications unit 4. Meanwhile, the vehicle 13 is provided with traveling course generation unit 5, communications unit 6, processing unit 7, position measuring unit 8, traveling mechanism unit 9, steering mechanism unit 10 and traveling course storage unit 11.

The position measuring unit 8 of the vehicle 13 measures the position of the vehicle 13. For example, as means for measuring the position, a tire revolution sensor and a giro mounted on the vehicle 13 are used. The vehicle position is measured according to an output signal of the tire revolution sensor and an output signal of the giro. GPS may also be used to measure the vehicle position.

The position data measured by the vehicle 13 is processed by the processing unit 7 and transmitted to the monitor station via the communications unit 6.

The communications unit 4 of the monitor station 12 receives the position data transmitted from a plurality of vehicles 13, 13 . . . . The processing unit 1 generates command data for instructing the vehicle 13 to travel, stop and the like in view of the positional relations among the plurality of vehicles 13, 13 . . . and transmits the command data from the communications unit 4 to the vehicles 13.

The communications unit 6 of the vehicle 13 receives the command data transmitted from the monitor station 12.

The processing unit 7 of the vehicle 13 generates a travel command and a steering command for traveling and steering the vehicle 13 according to the received command data. These travel and steering commands are output to the traveling mechanism unit 9 and the steering mechanism unit 10. As a result, the vehicle 13 is traveled and steered according to the command data transmitted from the monitor station 12.

The data input unit 3 of the monitor station 12 receives data about the earth unloading area 21 such as position data of the earth unloading area 21 obtained by teaching or measuring and also data of characteristics of the vehicle 13.

Data entered the data input unit 3 of the monitor station 12 are processed by the processing unit 1, and the position data of the plurality of earth unloading points 26, 26 . . . in the earth unloading area 21 are generated by the target point generating unit 2.

The processing unit 1 selects the next earth unloading point 26, to which the vehicle 13 reaches, among the plurality of earth unloading points 26, 26 . . . generated by the target point generating unit 2 and selects the vehicle 13 to be traveled to the earth unloading point 26. The position data of the selected earth unloading point 26 are transmitted to the selected vehicle 13 via the communications unit 4.

The communication unit 6 of the vehicle 13 receives the position data of the earth unloading point 26 transmitted from the monitor station 12.

The received position data of the earth unloading point 26 are processed by the processing unit 7, and the traveling course generating unit 5 generates the traveling course 27 routed to pass the earth unloading point 26 as target earth unloading point 26'. The generated position data of the traveling course 27 are stored in the traveling course storage unit 11.

The processing unit 7 compares the own vehicle position measured by the position measuring unit 8 with the successive positions on the traveling course 27 stored in the traveling course storage unit 11 to generate a traveling command and a steering command so that the vehicle 13 can sequentially follow the successive positions on the traveling course 27. The traveling and steering commands are output to the traveling mechanism unit 9 and the steering mechanism unit 10. As a result, the vehicle 13 is guided to travel along the traveling course 27 to reach the target earth unloading point 26'.

Figure 2:
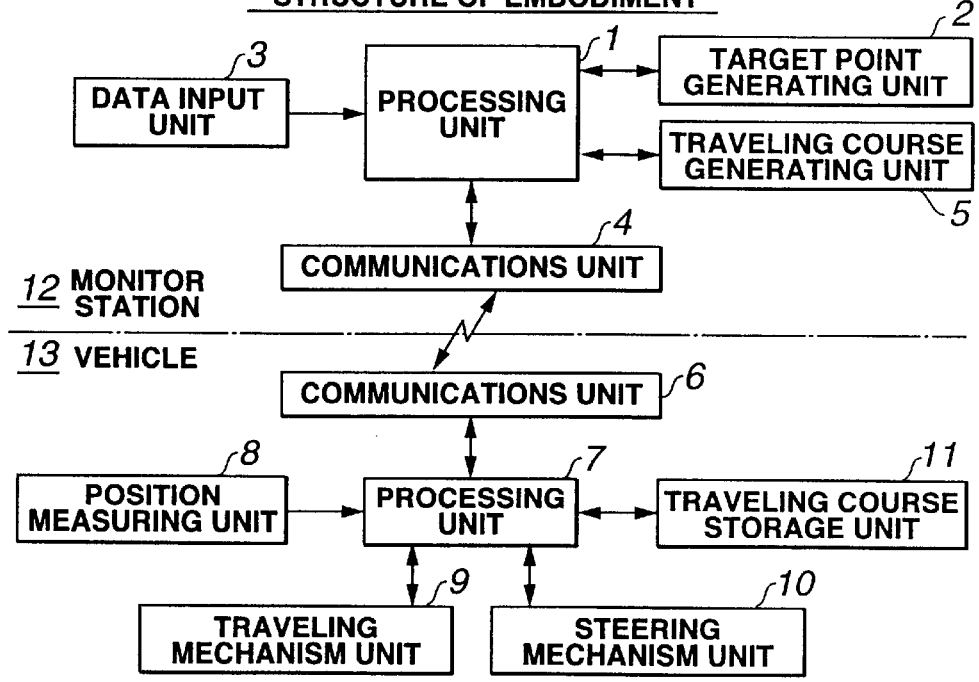
FIG. 2 is a block diagram showing a structure of the unmanned vehicle guidance running system of an embodiment.

The configuration shown in FIG. 1 has the traveling course generating unit 5 disposed on the vehicle 13 but may be disposed in the monitor station 12 as shown in FIG. 2.

In the configuration shown in FIG. 2, position data of the plurality of earth unloading points 26, 26 . . . in the earth unloading area 21 are generated by the target point generating unit 2 of the monitor station 12. The traveling course generating unit 5 generates the traveling course 27 routed to pass each of the plurality of earth unloading points 26, 26 . . . determined as the target earth unloading point 26'. The processing unit 1 selects the traveling course 27, along which the vehicle 13 travels next, among the traveling courses generated by the traveling course generating unit 5 and also selects the vehicle 13 to be traveled next. The position data of the selected traveling course 27 are transmitted to the selected vehicle 13 through the communications unit 4.

The communications unit 6 of the vehicle 13 receives the position data of the traveling course 27 transmitted from the monitor station 12. The received position data of the traveling course 27 are stored in the traveling course storage unit 11.

Referring to the flow chart of FIG. 16, a procedure of generating the earth unloading point 26 to be executed by the target point generating unit 2 of FIG. 1 or FIG. 2 and a procedure of generating the traveling course 27 to be executed by the traveling course generating unit 5 will be described also with reference to FIG. 3 to FIG. 15. The flow charts shown in FIG. 16 and FIG. 17 will be described on the assumption of the structure shown in FIG. 2. In other words, it is assumed that the monitor station 12 generates the earth unloading point 26 and the traveling course 27.

Figure 3:
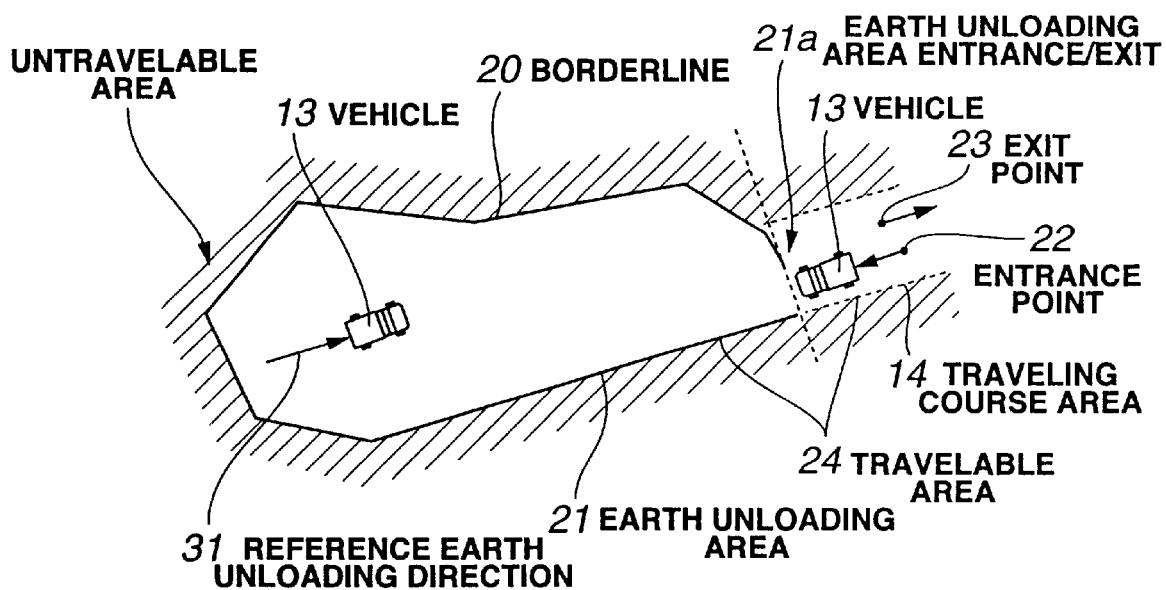
FIG. 3 is a diagram schematically showing a form of an earth unloading area.
Figure 4:
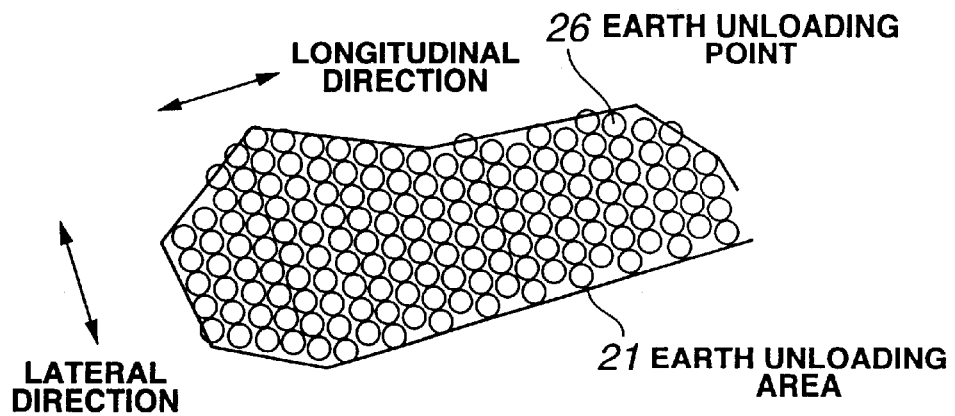
FIG. 4 is a diagram schematically showing earth unloading points to be generated.
Figure 5:
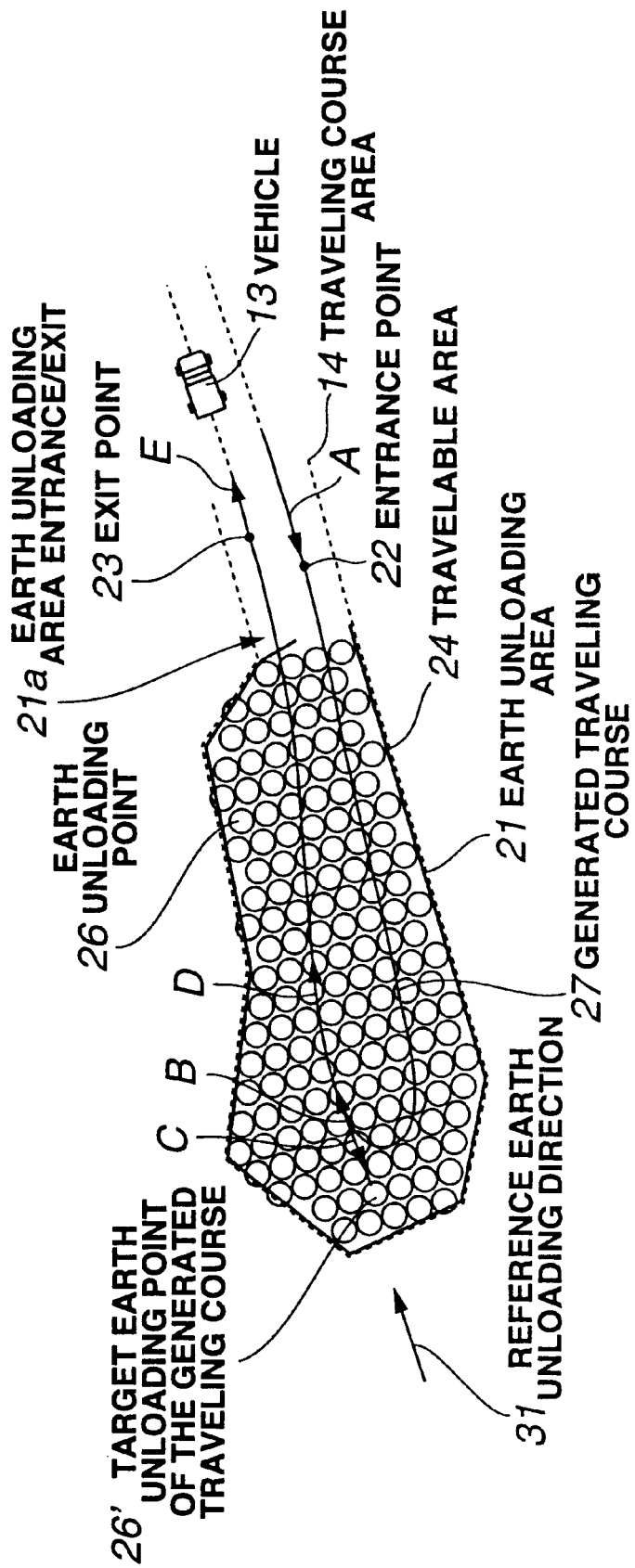
FIG. 5 is a diagram schematically showing a traveling course to be generated.

FIG. 3 is a schematic diagram showing an example shape of the earth unloading area 21. FIG. 4 is a diagram schematically showing the plurality of earth unloading points 26, 26 . . . produced in the earth unloading area 21. FIG. 5 is a diagram schematically showing the traveling course 27 routed to pass one of the plurality of earth unloading points 26, 26 . . . which is determined as the target earth unloading point 26'.

As shown in FIG. 3, the earth unloading area 21 is an area surrounded by borderline 20. The earth unloading area 21 has entrance/exit 21a for the vehicle 13. The entrance/exit 21a of the earth unloading area 21 is connected to traveling course area 14 which is a traveling road for the vehicle 13.

As shown in FIG. 4, a plurality of oval or round earth unloading points 26 having a predetermined diameter are disposed with equal-intervaled pitch d in a lateral direction and with equal-intervaled pitch h in a longitudinal direction as described afterward.

As shown in FIG. 5, the vehicle 13 is started to travel from a starting point and guided to travel along the traveling course area 14 in a direction indicated by arrow A to reach the entrance point 22 of the earth unloading area 21. After passing through the entrance point 22, the vehicle 13 enters the earth unloading area 21 through the earth unloading area entrance/exit 21a. The vehicle 13 switchbacks in the earth unloading area 21. Specifically, the vehicle 13 travels forward in a direction indicated by arrow B and reverses in a direction indicated by arrow C along reference earth unloading direction 31 as a rule. Then, the vehicle 13 stops at the target earth unloading point 26' to perform earth unloading work. More specifically, the vessel of the dump truck 13 is tilted to unload earth and sand from the vessel to the target earth unloading point 26'. After the earth unloading work, the vehicle 13 moves forward in a direction of arrow D and leaves the earth unloading area 21 through the earth unloading area entrance/exit 21a to enter the traveling course area 14. After passing the exit point 23, the vehicle 13 travels along the traveling course area 14 in a direction of arrow E to return to a traveling termination point.

As shown in FIG. 3, the earth unloading area 21 (the area surrounded by the borderline 20) and the traveling course area 14 form the travelable area 24 where the vehicle 13 can travel. The area other than the travelable area 24 is an untravelable area where the vehicle 13 cannot travel as indicated by oblique lines. For example, the outside of the borderline 20 of the earth unloading area 21 is an area such as a cliff or a wall where the vehicle 13 cannot travel geographically as shown in FIG. 12.

Figure 16:
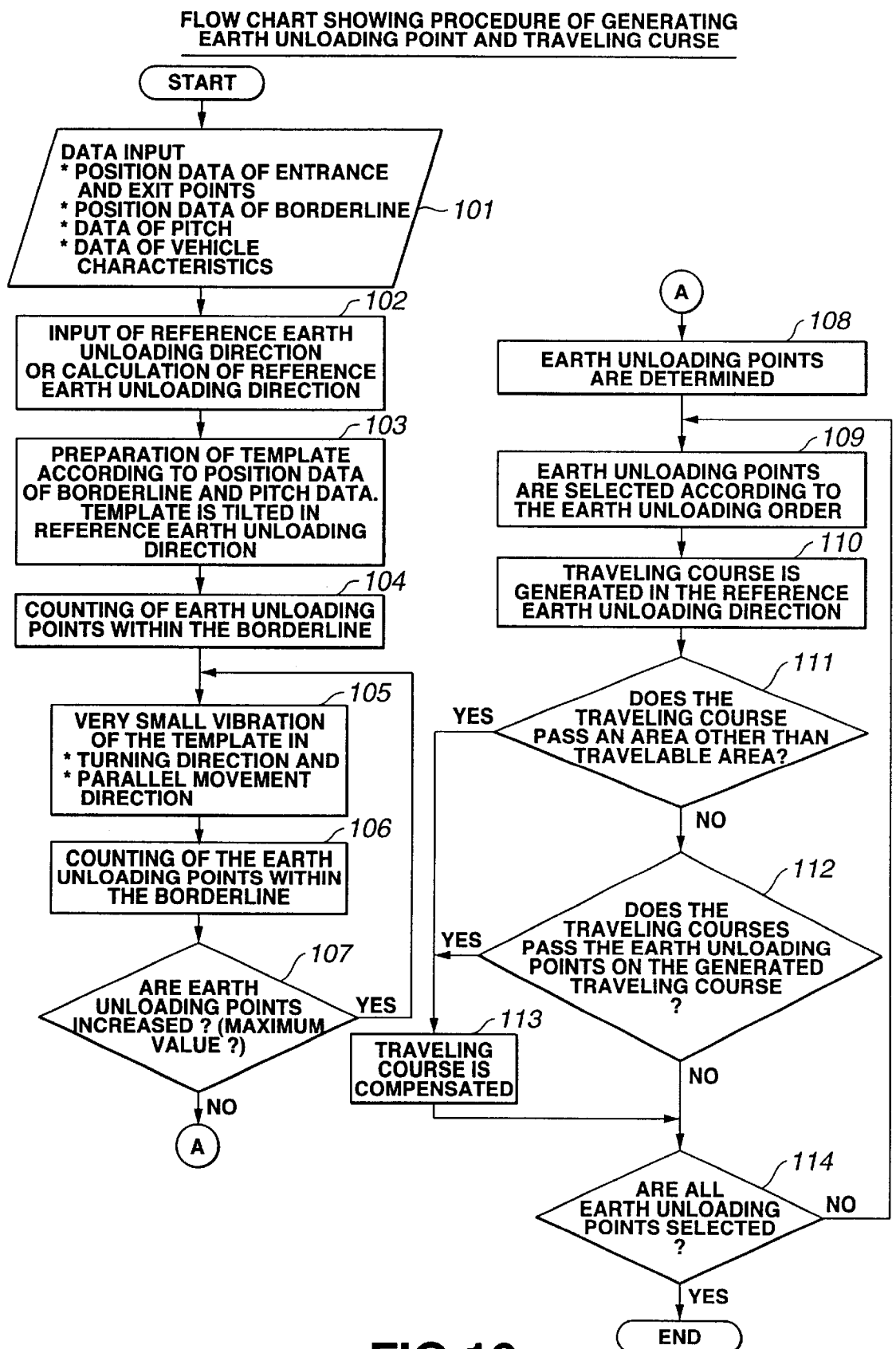
FIG. 16 is a flow chart showing a procedure of generating earth unloading points and generating a traveling course.

In step 101 of FIG. 16, position data indicating positions of the entrance point 22 and the exit point 23 of the earth unloading area 21 are entered through the data input unit 3 which is comprised of a keyboard or the like. Position data indicating a position of the borderline 20 of the earth unloading area 21 are also entered. The position data of the borderline 20, the entrance point 22 and the exit point 23 can be obtained by measuring. They may also be obtained by teaching. In other words, the position data of the borderline 20, the entrance point 22 and the exit point 23 are obtained from a route resulting from traveling by a teaching vehicle along the borderline 20 in advance. The position data of the borderline 20 may be obtained by measuring or teaching, and the positions of the entrance point 22 and the exit point 23 may be calculated from the positioned data of the borderline 20.

It is assumed in this embodiment that the traveling course 27, which is routed to pass the entrance point 22, the target earth unloading point 26' and the exit point 23, is generated. In this case, it is necessary that the entrance point 22 and the exit point 23 are disposed outside of the earth unloading area 21 and on the traveling course area 14 as shown in FIG. 3. If the entrance point 22 and the exit point 23 were provided within the earth unloading area 21, the target earth unloading point 26' might be disposed in the vicinity of the entrance/exit 21a of the earth unloading area 21 and it becomes impossible to unload earth and sand there.

It is also assumed in this embodiment that the traveling course 27 is generated from the position data of the entrance point 22 and the exit point 23, but the position data of the entrance point 22 and the exit point 23 may not be necessary in some cases. For example, where the approach to the earth unloading area 21 can be made from any direction, only the position data of the target earth unloading point 26' can be given to generate the traveling course 27 which is routed to pass the target earth unloading point 26'.

Data indicating the lateral pitch d and the longitudinal pitch h between the respective earth unloading points 26 are entered the data input unit 3.

FIG. 6(a) is a diagram schematically showing a relative position of the earth unloading points 26 generated in the earth unloading area 21.

As shown in FIG. 6(a), when reference earth unloading direction 31 to be described later is determined as a longitudinal direction, the earth unloading points 26 are disposed with a pitch of distance h in the longitudinal direction. And, the earth unloading points 26 are disposed with a pitch of distance d in a lateral direction perpendicular to the reference earth unloading direction 31.

For example, the pitch d in the lateral direction is 8 m and the pitch h in the longitudinal direction is 3.5 m for an 80-t class dump truck. Thus, the earth unloading points 26 are arranged most closely, and the largest number of earth unloading points 26 can be disposed in the earth unloading area 21. But, the pitches d, h are determined in view of various conditions such as nature of soil of the earth unloading area 21.

The diameter of the earth unloading point 26 is determined considering an amount and shape of earth and sand unloaded by the vehicle 13 at one time. A heap of earth and sand unloaded by the vehicle 13 is called a pile.

A side view of the pile 26c is shown in FIG. 6(c), and a top view of the pile 26c is shown in FIG. 6(b). When earth and sand are to be unloaded by the vehicle 13 as shown in FIGS. 6(b), (c), the earth unloading point 26 is determined to have a diameter so that the pile 26c formed by earth unloading fits in the earth unloading point 26. In other words, the earth unloading point 26 is formed of pile-forming area 26b having a predetermined diameter with target point 26a at the center (see FIG. 6(b)).

Vehicle characteristic data indicating the characteristics of the vehicle 13 are entered the data input unit 3.

The vehicle characteristic data mean data of limited conditions, that the vehicle is traveled and steered, such as a minimum turning radius and a stopping distance of the vehicle 12 (step 101).

Then, data indicating the reference earth unloading direction 31 are entered through the data input unit 3. The reference earth unloading direction 31 means a direction to be a standard in a direction that the vehicle 13 reverses to perform the earth unloading work. The reference earth unloading direction 31 is determined to be parallel to the longitudinal direction of the earth unloading area 21 in consideration of the shape of the earth unloading area 21 (see FIG. 3). The reference earth unloading direction 31 may be determined by calculating from the position data of the borderline 20, entrance point 22 and exit point 23 of the earth unloading area 21 (step 102).

Then, the target point generating unit 2 performs processing to arrange and generate the plurality of earth unloading points 26, 26 . . . in the earth unloading area 21 according to the input data (steps 103 to 108).

Figure 7:
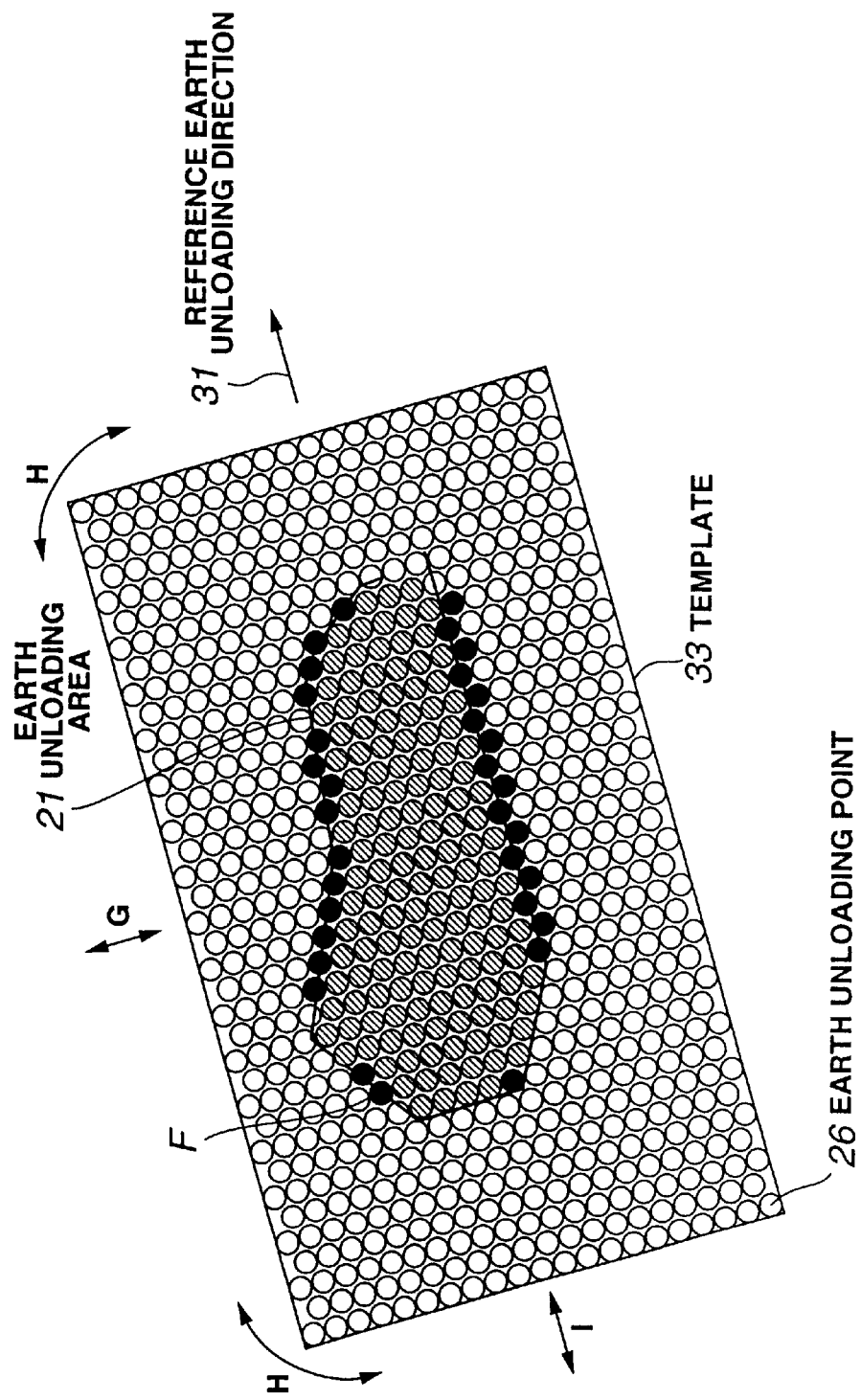
FIG. 7 is a diagram illustrating a method of producing earth unloading points.

Template 33 shown in FIG. 7 is prepared according to the input position data of the borderline 20 of the earth unloading area 21 and the pitch data d, h (see FIG. 6(a)) of the earth unloading points 26. The template 33 is prepared to have a size enough to fully surround the borderline 20 according to the position data of the borderline 20. And, according to the pitch data d, h, the template 33 is prepared so that the earth unloading points 26 are arranged with pitches d, h as shown in FIG. 6(a).

After the template 33 is prepared as described above, the borderline 20 of the earth unloading area 21 and the plurality of earth unloading points 26, 26 . . . on the template 33 are compared as shown in FIG. 7.

When they are compared first, the reference earth unloading direction 31 and the direction of the pitch h in the longitudinal direction on the template 33 become parallel (step 103).

In the first compared state, the number of the earth unloading points 26 on the template 33 which are present within the borderline 20 is counted. In this case, the earth unloading points 26 existing on the borderline 20 as indicated by arrow F in FIG. 7 are excluded from being counted. The earth unloading points not counted are indicated in black. Meanwhile, the number of earth unloading points 26 fully surrounded by the borderline 20 is counted. The earth unloading points 26 to be counted are indicated by oblique lines (step 104).

Then, with the borderline 20 of the earth unloading area 21 fixed, the template 33 is turned by a very small angle in a direction indicated by arrow H, slightly parallel-moved in the lateral direction as indicated by arrow G and also slightly parallel-moved in the longitudinal direction as indicated by arrow I. Thus, the relative positional relation of the template 33 to the borderline 20 of the earth unloading area 21 is changed as it is turned and moved slightly as described above. The relative positional relation of the template 33 to the borderline 20 of the earth unloading area 21 may be changed very slightly by a very small amount of vibration of one or a combination of any two of the turning in the arrow H direction, the parallel movement in the arrow G direction and the parallel movement in the arrow I direction (step 105).

When the relative positional relation of the template 33 to the borderline 20 of the earth unloading area 21 is changed by the aforesaid very small amount of rotation and movement, the number of earth unloading points 26 on the template 33 which are present within the borderline 20 in the changed state is counted in the same way as in the aforesaid step 104 (step 106).

And, the counted value of the earth unloading points 26 counted in step 106 is compared with the previously counted value to determine whether the present counted value of the earth unloading points 26 has increased from the previously counted value (step 107). As long as the counted value has increased (YES in step 107), the procedure is shifted to step 105 and it is repeated that the relative positional relation of the template 33 to the borderline 20 of the earth unloading area 21 is changed (step 105) and the changed number of earth unloading points 26 within the borderline 20 is counted (step 106).

If it is judged in step 107 that the counted value of the earth unloading points 26 does not increase, it is judged that the counted value obtained at that time is a maximum value of the number of earth unloading points 26 within the borderline 20 (NO in step 107), and the procedure is shifted to step 108.

Then, the locations of the respective earth unloading points 26, 26 . . . present within the earth unloading area 21 are determined from the relative positional relation of the template 33 to the borderline 20 of the earth unloading area 21 when the counted value has become maximum. Specifically, because the location of the borderline 20 is known, the locations of the plurality of earth unloading points 26, 26 . . . within the earth unloading area 21 can be calculated from the location of the borderline 20, the relative positional relation of the template 33 to the borderline 20 and the arrangement pitches d, h of the earth unloading points 26 on the template (step 108).

According to the generated position data of the plurality of earth unloading points 26, 26 . . . within the borderline 20, the traveling course 27 having the earth unloading points 26 as the target earth unloading points 26' is generated for each of the earth unloading points 26 (steps 109 to 114).

In step 109, the order of earth unloading is allotted to the respective earth unloading points 26, 26 . . . according to the position data of the borderline 20 of the earth unloading area 21. And, each earth unloading point is selected from the plurality of earth unloading points 26, 26 . . . according to the order of earth unloading (step 109).

According to the position data of the selected earth unloading points 26, position data of the traveling course 27, which is routed to pass the selected earth unloading points 26 as the target earth unloading points 26', are generated. In this case, the traveling course 27 is generated so that the vehicle 13 is reversed along the reference earth unloading direction 31 to perform the earth unloading work. And, the traveling course 27 is generated as a basic switchback route as shown in FIG. 5.

But, it is not necessary to prepare the whole of the traveling course 27 but enough by preparing only a part of it which is close to the target earth unloading point 26'(step 110).

In step 111, it is judged whether the traveling course 27 where the vehicle 13 is reversed in the reference earth unloading direction 31 generated in step 110 passes an area (untravelable area) other than the travelable area 24. This judgment is made according to data indicating the location of the travelable area 24. The position data of the travelable area 24 are determined from the position data of the borderline 20 and the position data of the traveling course area 14 (see FIG. 3).

Figure 11:
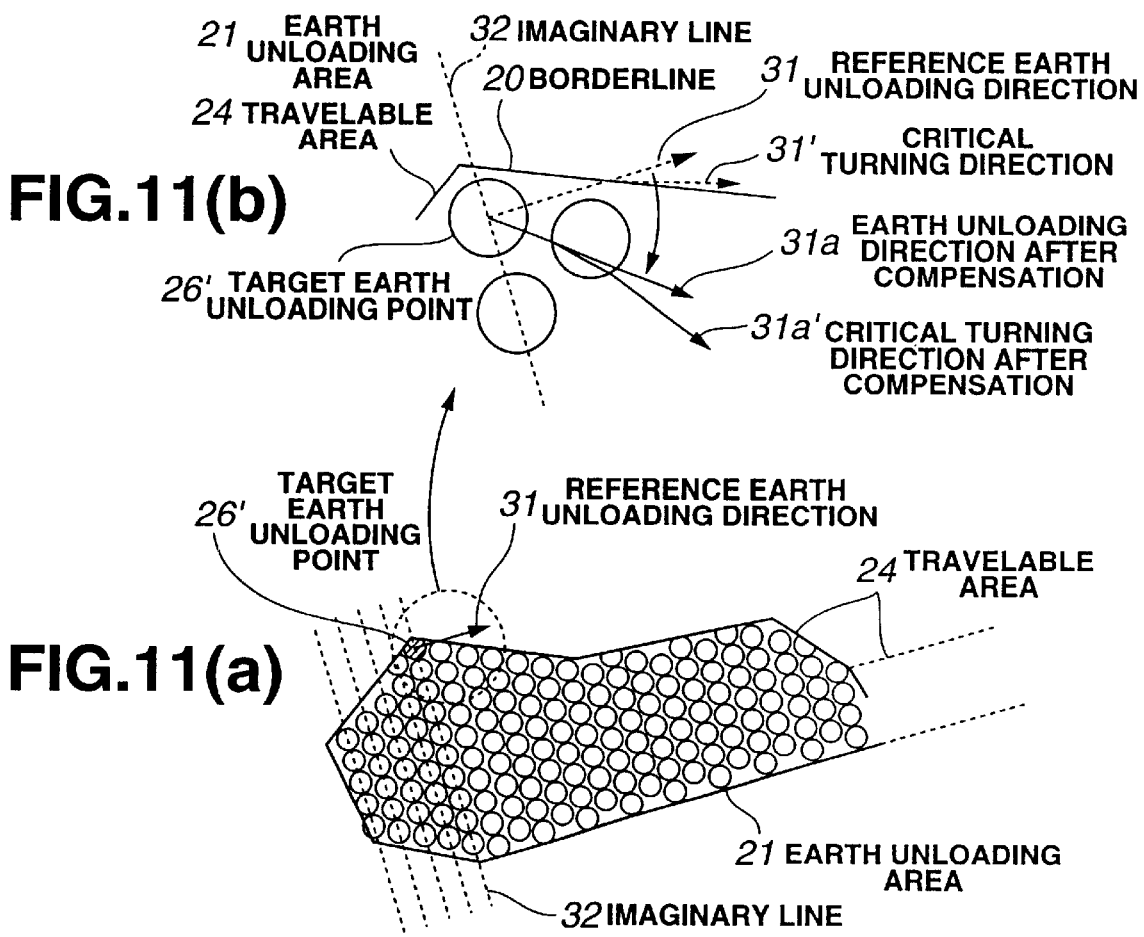
FIG. 11 is a diagram showing a state of changing an earth unloading direction in the vicinity of a target earth unloading point, FIG. 11(a) being a general view and FIG. 11(b) being a magnified view of the vicinity of the borderline.

FIG. 11 shows a state that the vehicle 13 passes an area (outside of the borderline 20 of the earth unloading area 21) other than the travelable area 24. FIG. 11(a) is a general view of the earth unloading area 21, and FIG. 11(b) is a magnified view showing the vicinity of the borderline 20 of the earth unloading area 21.

As shown in FIG. 11, where the target earth unloading point 26' is present in the vicinity of the borderline 20 and the vehicle 13 is reversed in the reference earth unloading direction 31, the vehicle 13 passes an area other than the travelable area 24 as indicated by a broken line. Even when the vehicle 13 is turned to a limit according to the vehicle characteristic data (minimum turning radius of the vehicle 13) given to the data input unit 3, the vehicle 13 travels as indicated by 31' and passes an area other than the travelable area 24. It means that the vehicle 13 falls a cliff or hits a wall on an actual work site as shown in FIG. 12 (step 111).

If the traveling course 27 generated so that the vehicle 13 travels in the reference earth unloading direction 31 might is routed to pass an area other than the travelable area 24, the earth unloading direction is changed so that the vehicle 13 passes the inside of the travelable area 24. Namely, it is changed to earth unloading direction 31a which is tilted by an predetermined angle with respect to the reference earth unloading direction 31.

When the vehicle 13 is reversed at the target earth unloading point 26' in the corrected earth unloading direction 31a, the vehicle 13 passes the inside of the travelable area 24. In the drawing, 31a indicates a forward direction when the vehicle 13 is reversed with the minimum turning radius.

And, the traveling course 27 is compensated so to reverse the vehicle 13 in the corrected earth unloading direction 31a to perform the earth unloading work (step 113).

When it is judged that the traveling course 27 prepared this time is routed to pass the target earth unloading point 26' on the previously generated traveling course 27, the present traveling course 27 is corrected so that its route does not pass the target earth unloading point 26' present on the previously generated traveling course 27 (steps 112, 113). This will be described with reference to FIG. 13.

Figure 13:
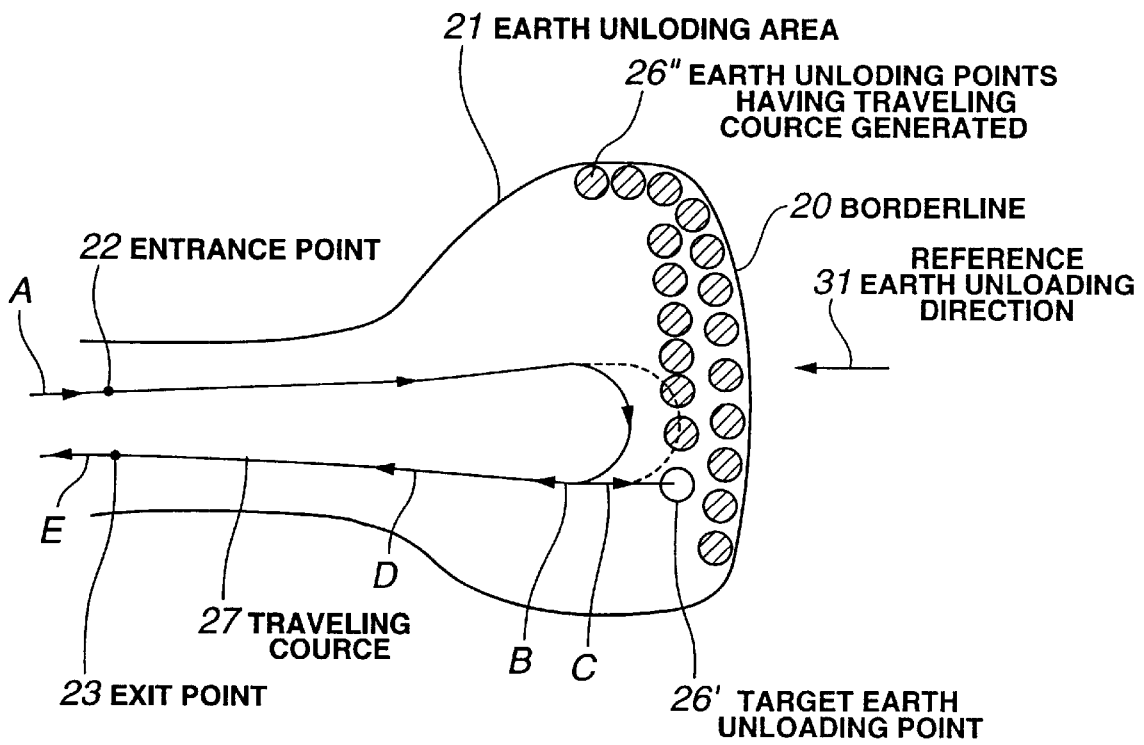
FIG. 13 a diagram illustrating a manner of generating a traveling course.

The traveling course 27 generated according to the earth unloading point 26 which was previously selected in step 109 corresponds to the traveling course 27 where the vehicle 13 has completed traveling already on the work site. Therefore, the pile 26c (FIG. 6(c)) is formed at the earth unloading point 26" on the traveling course 27 previously generated (completed traveling) as shown in FIG. 13. The earth unloading point 26" is indicated by oblique lines.

Therefore, if the traveling course 27 to be generated this time is the course routed to pass the target earth unloading point 26" on the previously generated traveling course 27, the vehicle 13 comes to interfere with the pile 26c as indicated by a broken line.

Accordingly, according to the position data of the earth unloading point 26" (where the pile 26c is selected) already selected in step 109, it is judged whether the traveling course 27 is routed to pass those selected earth unloading points 26", namely whether the vehicle 13 traveling the traveling course 27 to be generated this time interferes with the pile 26c or not. This judgment can be made depending on whether the area resulting from the exclusion of the selected earth unloading point 26" from the earth unloading area 21 and the traveling course 27 mutually compared have an unoverlapped portion. Such judgment may be made by comparing the already selected earth unloading point 26" and the traveling course 27 to see whether they are mutually overlapped (step 112).

As a result, when it is judged that when the traveling course 27 is routed to pass the selected earth unloading point 26", namely the vehicle 13 travels the traveling course 27 to be generated this time, the vehicle 13 interferes with the pile 26c, the traveling course 27 is compensated as indicate by a solid line in FIG. 13 so that the traveling course 27 is not routed to pass the earth unloading points 26".

FIG. 13 shows a method of compensating the traveling course 27 by slightly changing a switchback route with the reference earth unloading direction 31 as it is without changing the earth unloading direction with respect to the reference earth unloading direction 31.

Figure 14:
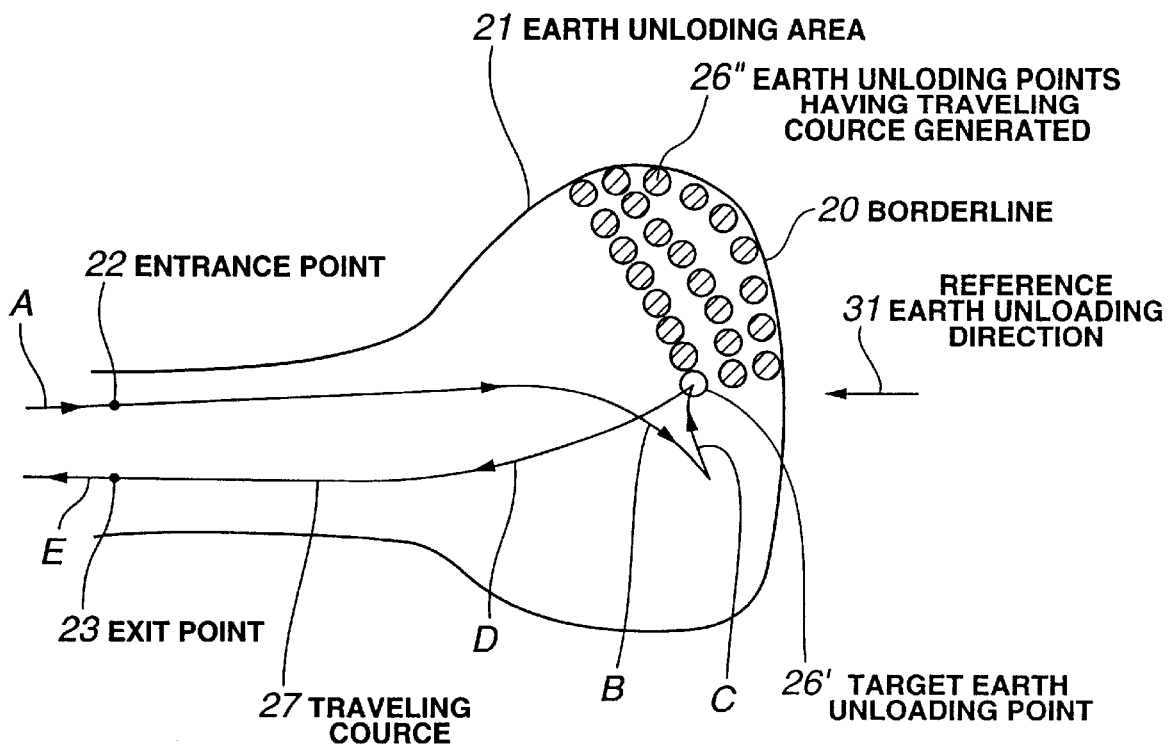
FIG. 14 a diagram illustrating a manner of generating a traveling course.

Depending on a state of the selected earth unloading point 26" (formed pile 26c), the traveling course 27 may be corrected by changing the basic switchback route and also changing the earth unloading direction with respect to the reference earth unloading direction 31 as shown in FIG. 14 (step 113).

Meanwhile, when it is judged NO in steps 111 and 112, namely the traveling course 27 generated to follow the basic switchback route in the reference earth unloading direction 31 is determined as a course that the vehicle 13 can pass within the travelable area 24 and does not interfere with the formed piles 26c, the traveling course 27 is not compensated in step 113.

Thus, when all the earth unloading points 26 within the borderline 20 of the earth unloading area 21 obtained in step 108 are selected and the traveling course 27 is generated for all the earth unloading points 26 (YES in step 114), the processing by the traveling course generating unit 5 is terminated.

The processing shown in FIG. 17 may be performed instead of the processing described with reference to FIG. 16.

Figure 17:
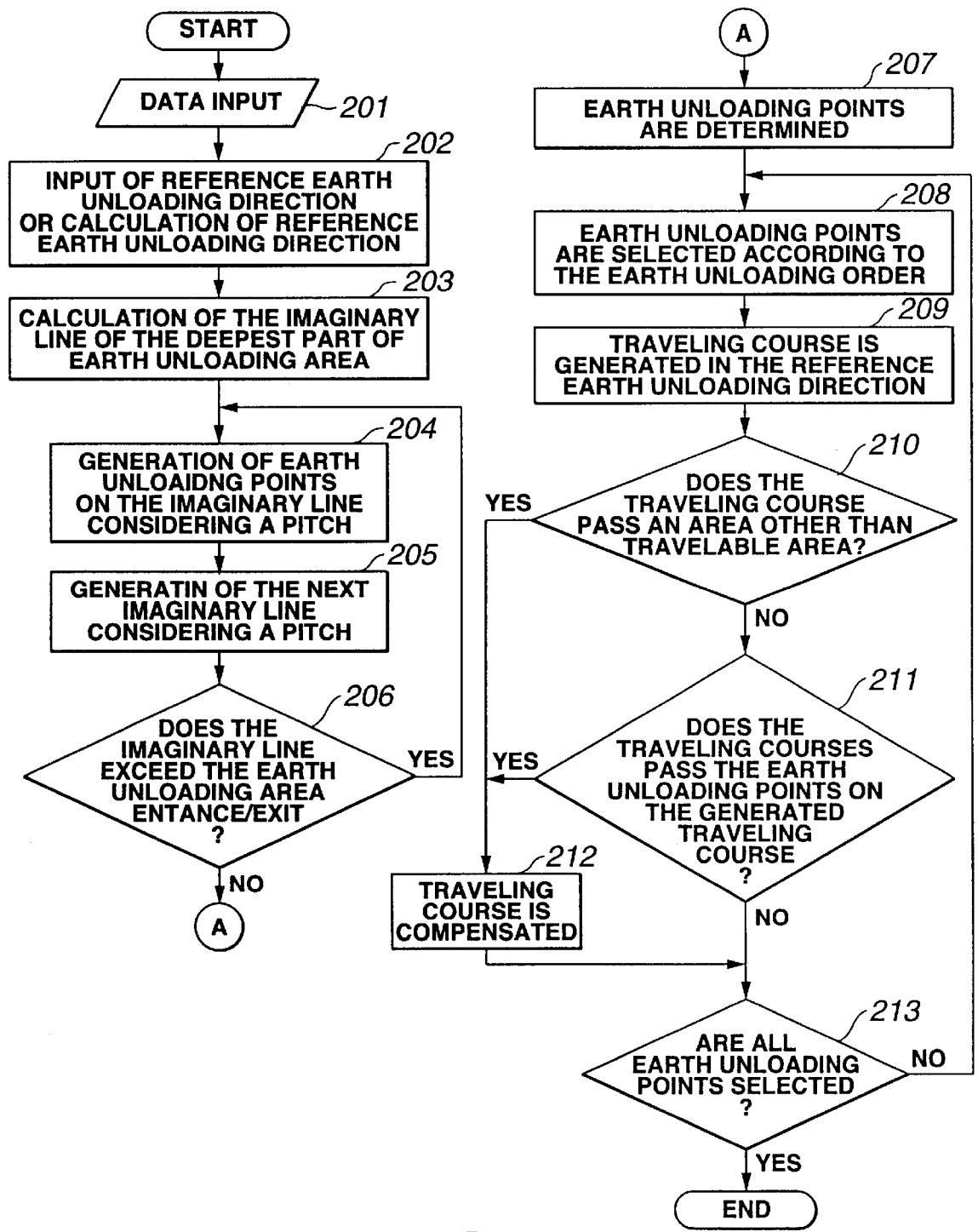
FIG. 17 is a flow chart showing a procedure of generating earth unloading points and generating a traveling course different from FIG. 16.

Steps 201, 202 of FIG. 17 are the same as steps 101, 102 of FIG. 16, and step 207 to step 213 of FIG. 17 are the same as step 108 to step 114 of FIG. 16, so that their processing will not be described. Only steps 203 to 206 different from FIG. 16 will be described also with reference to FIG. 8 to FIG. 10.

Figure 8:
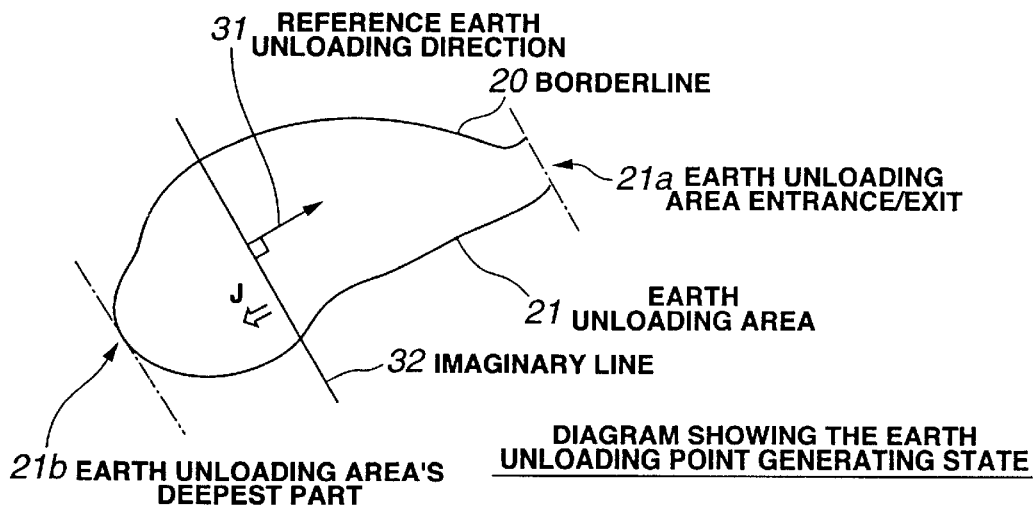
FIG. 8 is a diagram illustrating a method of producing earth unloading points different from FIG. 7.

Specifically, imaginary line 32 perpendicular to the reference earth unloading direction 31 is formed in step 203 as shown in FIG. 8. The imaginary line 32 is parallel-moved to a position not exceeding deepest part 21b of the earth unloading area 21 as indicated by arrow J. The deepest part 21b means a border of the earth unloading area 21 opposed to the entrance/exit 21a of the earth unloading area 21. The deepest part 21b is determined according to the position data of the borderline 20. The imaginary line 32 is a line on which the earth unloading points 26 are arranged with the lateral pitch d as shown in FIG. 6(a), and an interval of shifting the imaginary line 32 corresponds to the longitudinal pitch h.

Figure 9:
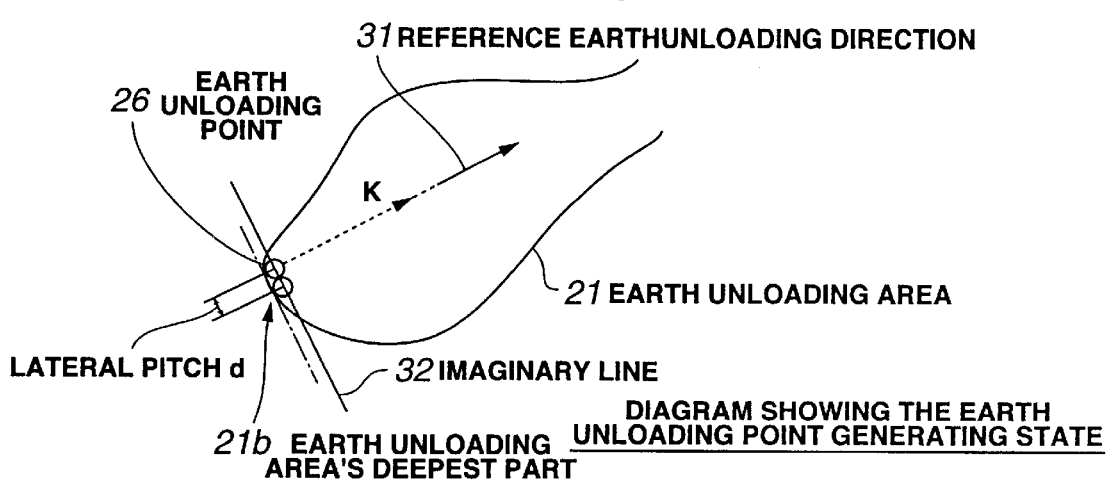
FIG. 9 is a diagram subsequent to FIG. 8, showing a state of generating earth unloading points.
Figure 10:
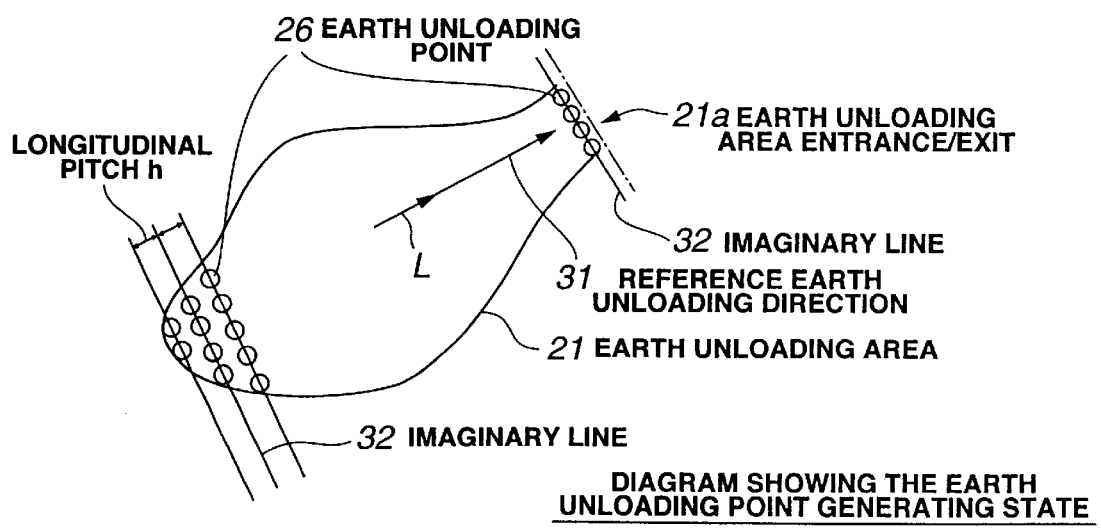
FIG. 10 is a diagram subsequent to FIG. 9, showing a state of generating earth unloading points.

Thus, the imaginary line 32 is parallel-moved to the deepest part 21b and positioned at a location where the earth unloading points 26 on the imaginary line 32 are just fit inside the borderline 20 as shown in FIG. 9 (step 203). The quantity and location of the earth unloading points 26 on the imaginary line 32 which are located within the borderline 20 are determined from the location where the imaginary line 32 is positioned, the lateral pitch d on the imaginary line 32 and the location of the borderline 20 (step 204).

Then, the imaginary line 32 is parallel-moved as indicated by arrow J in a direction of the entrance/exit 21a opposite to the deepest part 21b of the earth unloading area 21 (see FIG. 9).

The imaginary line 32 is moved with the longitudinal pitch h at a time and positioned with each pitch h. The imaginary line 32 is parallel-moved as indicated by arrow L to a position not exceeding the entrance/exit 21a of the earth unloading area 21 (step 205).

Every time the imaginary line 32 is moved and positioned with the each longitudinal pitch h, it is judged whether the positioned location does not exceed the entrance/exit 21a of the earth unloading area (step 206).

Thus, the imaginary line 32 is positioned up to location not exceeding the earth unloading area entrance/exit 21a, and the quantity and locations of the earth unloading points 26 on the imaginary lines 32 which are housed within the borderline 20 at the respective positioning locations in the same way as in step 204. But, every time the imaginary line 32 is moved with the longitudinal pitch h, the earth unloading points 26 are alternately arranged on the adjacent imaginary lines 32 so to be in the closest arrangement as shown in FIG. 6(a) (step 204).

The locations of the respective earth unloading points 26, 26 . . . present in the earth unloading area 21 are determined from the positioned locations of the respective imaginary lines 32 from the deepest part 21b to the entrance/exit 21a of the earth unloading area 21 (step 207).

Processing for generating the traveling curse 27 in step 208 and following steps is the same as in FIG. 16.

As described above, the earth unloading point 26 is selected by the target point generating unit 2 of the monitor station 12 (step 109, step 208), and the traveling courses 27, 27 . . . are generated for the selected respective earth unloading points 26, 26 . . . by the traveling course generating unit 5 of the monitor station 12 (steps 110 to 114 and steps 209 to 213). And, the monitor station 12 selects the traveling course 27 where the vehicle 13 is to be traveled next is selected from all of the traveling courses 27, 27 . . . already generated according to the earth unloading order and transmits position data of the selected traveling course 27 to the vehicle 13 to be traveled next. The vehicle 13 stores the transmitted position data of the traveling course 27 into the traveling course storage unit 11.

When configured as shown in FIG. 1, the target point generating unit 2 of the monitor station 12 processes to select the earth unloading point 26 (steps 109, 208). The position data of the selected earth unloading point 26 are transmitted to the vehicle 13 to be traveled next. The traveling course generating unit 5 of the vehicle 13 receives the position data of the selected earth unloading point 26 and generates a traveling course 27 which is routed to pass the selected earth unloading point 26 (steps 110 to 114 and steps 209 to 213). And, the position data of the generated traveling course 27 are stored in the traveling course storage unit 11.

Thus, the position data of the traveling course 27 are stored in the traveling course storage unit 11 when configured as shown in FIG. 2 or FIG. 1.

When traveling the vehicle 13, the position data of the traveling course 27 stored in the traveling course storage unit 11 are read, and the processing unit 7 compares the position of the own vehicle measured by the position measuring unit 8 with the sequential positions on the traveling course 27 read from the traveling course storage unit 11 and generates a traveling command and a steering command to make the vehicle 13 sequentially follow the sequential positions on the traveling course 27. Those traveling and steering commands are output to the traveling mechanism unit 9 and the steering mechanism unit 10. Consequently, the vehicle 13 is guided to travel along the traveling course 27 to arrive at the target earth unloading point 26'.

Specifically, the vehicle 13 starts traveling from a starting point and travels the traveling course area 14 in a direction indicated by arrow A to arrive at the entrance point 22 of the earth unloading area 21 as shown in FIG. 13. The vehicle 13 enters the earth unloading area 21 through the entrance point 22. In the earth unloading area 21, the vehicle 13 performs switchback traveling. Specifically, the vehicle 13 moves forward in a direction indicated by arrow B and reverses in a direction indicated by arrow C along the reference earth unloading direction 31. The vehicle 13 stops at the target earth unloading point 26' to perform the earth unloading work. The vessel of the dump truck 13 is tilted to unload earth and sand from the vessel at the target earth unloading point 26'. After completing the earth unloading work, the vehicle 13 moves forward in a direction indicated by arrow D to leave the earth unloading area 21 through the entrance/exit 21a of the earth unloading area and enters the traveling curse area 14. The vehicle 13 passes the exit point 23 and travels the traveling course area 14 in a direction indicated by arrow E to return to the termination point.

In the above case, the traveling course 27 is changed from the broken line to the solid line, so that the vehicle 13 does not interfere with the formed piles 26c (earth unloading points 26"). Even if the target earth unloading point 26' is present near the borderline 20, the vehicle 13 does not pass an area other than the travelable area 24. Thus, the vehicle 13 is prevented from interfering with a wall or falling over a cliff.

According to this embodiment, the vehicle 13 can be guided to travel safely to perform the earth unloading work safely.

According to the embodiment, the plurality of target earth unloading points 26', 26' . . . are arranged with equal-interval pitch d in the lateral direction and with equalinterval pitch h in the longitudinal direction so to be present in the maximum quantity within the earth unloading area 21. Thus, the earth unloading points 26 can be arranged uniformly and closely, and the earth unloading work can be performed efficiently. Therefore, the piles 26c are uniformly and closely formed within the earth unloading area 21. Where the land is leveled after the earth unloading work, the piles 26c can be leveled uniformly, so that the ground leveling work can be made efficiently.

And, the position data of the plurality of target earth unloading points 26', 26'. . . can be obtained automatically according to the embodiment without depending on a conventional method such as the teaching method. Specifically, when the dispensing area 21 where the vehicle 12 shall arrive is given, the plurality of target earth unloading points 26', 26' . . . are automatically generated within the earth unloading area 21, and the traveling course 27 is generated for each of the target earth unloading points 26'. Compared with the conventional teaching method, the traveling course 27 can be generated easily without requiring much time or man-hour. As a result, the efficiency of the traveling course generating work is improved remarkably.

Figure 15:
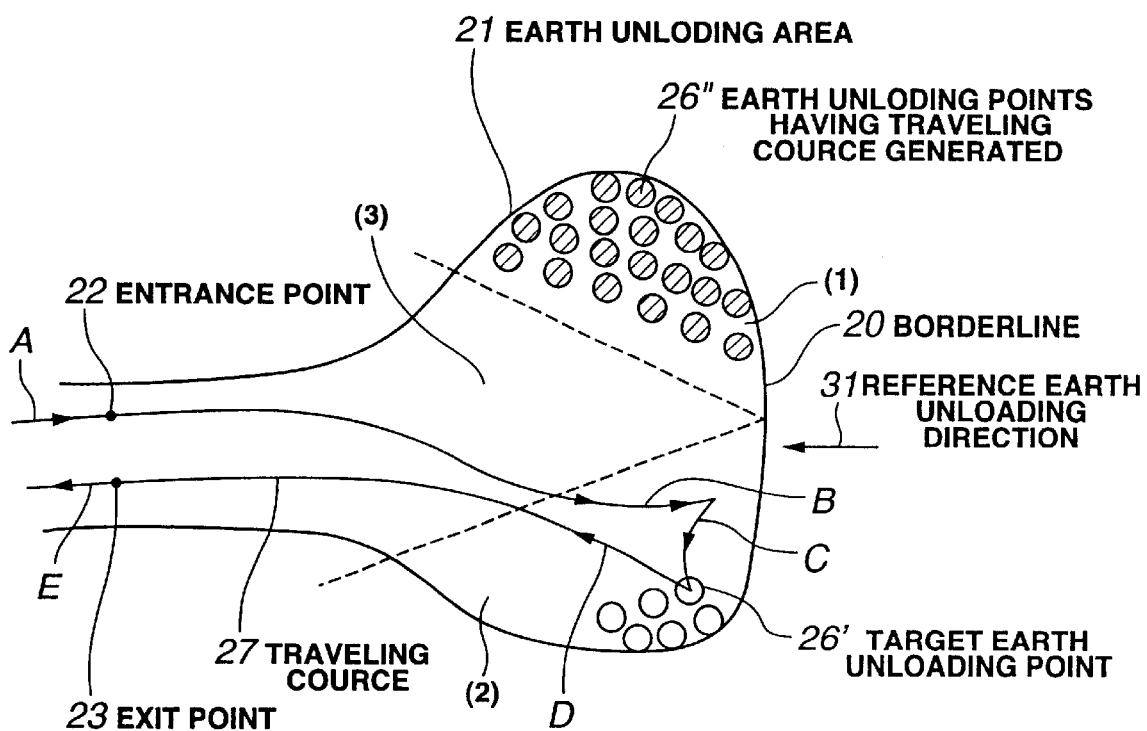
FIG. 15 a diagram illustrating a manner of generating a traveling course.

FIG. 15 shows an example of the procedure for earth unloading within the earth unloading area 21. Where the earth unloading area 21 has a shape as shown in FIG. 15, earth unloading in portion (1) is started from the side closer to the borderline 20. Then, earth unloading in portion (2) is performed from the side closer to the borderline in the same way. Lastly, earth unloading in center portion (3) is also performed from the side closer to the borderline 20.

In the embodiment, it was described assuming that the vehicle 13 carried to unload earth and sand in the earth unloading area 21 as shown in FIG. 12. In other words, it was assumed that the piles 26c were formed within the earth unloading area 21. But, it is also possible to determine the target earth unloading points 26' so that the vehicle 15 is guided to the target earth unloading points 26' at the limit of the borderline 20 so to unload earth and sand to the outside of the borderline 20 as shown in FIG. 12. In this case, the piles 26c are not overlaid within the earth unloading area 21, and the man-hour for the leveling work can be reduced. This invention can also be applied to a work that a vehicle 16 such as a bulldozer which levels the formed piles 26c is guided instead of the vehicle 13 for carrying earth and sand to travel to the target earth unloading points 26' and to unload earth and sand at the relevant target earth unloading point 26' so to level the ground.

Where this embodiment is applied to a manned vehicle, the target earth unloading point 26' in the earth unloading area 21 may be indicated on the screen mounted on the vehicle to assist the operator to operate the vehicle.

The traveling course 27 was generated for each of the generated target earth unloading points 26' in this embodiment, but it is not always necessary to generate the traveling curse 27 but at least the target earth unloading point 26' only has to be able to be generated. For example, where the embodiment is applied to an unmanned vehicle having an artificial intelligence, the unmanned vehicle can be traveled to the target earth unloading point 26' according to an inference engine by giving the position data of the target earth unloading point 26' to the vehicle.

It was assumed in this embodiment that the plurality of earth unloading points were generated in the earth unloading area. But, when the earth unloading area is a target area where the vehicle has to reach and a plurality of target points have to be arranged therein, the invention can be applied to any target area instead of the earth unloading area.

INDUSTRIAL APPLICABILITY

The invention is a vehicle guidance device which is effective in guiding to travel an unmanned off-road dump truck on a work site such as a mine.

What is claimed is:

1. A vehicle guiding device which receives position data of target points where a vehicle is to reach and guides the vehicle to travel to the target points according to the position data of the target points, the device comprising:

area data input means for inputting position data of a borderline of a target area where the vehicle is to reach;

target point generating means for generating position data of a plurality of target points in the target area according to the position data of the target area which are inputted to the area data input means; and guidance means for sequentially guiding the vehicle to travel to the plurality of target points in the target area by sequentially giving the position data of the plurality of target points generated by the target point generating means.

2. The vehicle guidance device according to claim 1, wherein the target area is an earth unloading area where earth and sand are unloaded.

3. The vehicle guidance device according to claim 2, wherein the target point generating means arranges a plurality of target earth unloading points at equal intervals in the earth unloading area according to the position data of the borderline of the earth unloading area and data indicating an arrangement interval of the target earth unloading points.

4. A vehicle guidance device which is provided with vehicle position measuring means for measuring a current position of an own vehicle, receives position data of target points where the vehicle is to reach, generates data of a traveling course which is routed to pass through the target points according to the position data of the target points, and compares the current vehicle position measured by the vehicle position measuring means with a position on the generated traveling course to guide the own vehicle to travel along the traveling course, the device comprising:

area data input means for inputting position data of a borderline of a target area where the vehicle is to reach;

target point generating means for generating position data of a plurality of target points in the target area according to the position data of the target area which are inputted to the area data input means;

traveling course generating means for generating for each of the target points data of a traveling course, which is routed from an entrance of the target area to one of the plurality of target points in the target area and to an exit of the target area, according to the position data of the plurality of target points in the target area generated by the target point generating means; and guidance means for sequentially guiding the vehicle to travel along each of the traveling course generated by the traveling course generating means.

5. The vehicle guidance device according to claim 4, wherein the target area is an earth unloading area where earth and sand are unloaded.

6. The vehicle guidance device according to claim 5, wherein the target point generating means arranges the plurality of target earth unloading points at equal intervals in the earth unloading area according to the position data of the borderline of the earth unloading area and data indicating the arrangement intervals of the target earth unloading points.

7. The vehicle guidance device according to claim 4, wherein:

the area data input means comprises means for inputting position data of the entrance point and the exit point of the target area, and the traveling course generating means generates for each of the target points data of the traveling course, which is routed from the entrance point of the target area to one of the plurality of target points in the target area and to the exit point of the target area, according to the position data of the entrance point and exit point of the target area.

8. A vehicle guidance device which is provided with vehicle position measuring means for measuring a current position of an own vehicle, receives position data of target points where the vehicle is to reach, generates data of a traveling course routed to pass through the target points according to the position data of the target points, and compares the current vehicle position measured by the vehicle position measuring means with a position on the generated traveling course to guide the own vehicle to travel along the traveling course, the device comprising:

area data input means for inputting position data of a borderline of a target area where the vehicle is to reach;

untravelable area data input means for inputting position data of an untravelable area indicating an area where the vehicle cannot travel;

target point generating means for generating position data of a plurality of target points in the target area according to the position data of the target area which are inputted to the area data input means;

traveling course generating means for generating for each of the target points data of a traveling course, which is routed from an entrance of the target area to reach one of the plurality of target points in the target area and to an exit of the target area so not to pass the untravelable area, according to the position data of the plurality of target points in the target area generated by the target point generating means and the position data of the untravelable area which are inputted to the untravelable area data input means; and guidance means for sequentially guiding the vehicle to travel along each of the traveling courses generated by the traveling course generating means.

9. The vehicle guidance device according to claim 8, wherein the target area is an earth unloading area where earth and sand are unloaded.

10. The vehicle guidance device according to claim 9, wherein, the target point generating means arranges the plurality of target earth unloading points at equal intervals in the earth unloading area according to the position data of the borderline of the earth unloading area and the data indicating arrangement intervals of the target earth unloading points.

11. The vehicle guidance device according to claim 8, wherein:

the untravelable area data input means comprises means for inputting the position data of an entrance point and an exit point of the target area, and the traveling course generating means generates for each of the target points data of the traveling course, which is routed from the entrance point of the target area to reach one of the plurality of target points in the target area and to the exit point of the target area so not to pass the untravelable area, according to the position data of the entrance point and the exit point of the target area.

12. A vehicle guidance device which is provided with vehicle position measuring means for measuring a current position of an own vehicle, receives position data of target points where the vehicle is to reach, generates data of a traveling course routed to pass through the target points according to the position data of the target points, compares the current vehicle position measured by the vehicle position measuring means with a position on the generated traveling course to guide the own vehicle to travel along the traveling course, the device comprising:

earth unloading area data input means for inputting position data of a borderline of the earth unloading area where earth and sand are to be unloaded;

target point generating means for generating position data of a plurality of target earth unloading points in the earth unloading area according to position data of the earth unloading area which are inputted to the earth unloading area data input means;

traveling course generating means for sequentially generating for each of the target earth unloading points data of the traveling course, which is routed to pass an entrance of the earth unloading area to reach a first target earth unloading point and to pass an exit of the earth unloading area so not to pass the target earth unloading points on the previously generated traveling course, according to the position data of the plurality of target earth unloading points in the earth unloading area generated by the target point generating means; and guidance means for guiding the vehicle to travel along the traveling course sequentially generated by the traveling course generating means.

13. The vehicle guidance device according to claim 12, wherein the target point generating means arranges the plurality of target earth unloading points at equal intervals in the earth unloading area according to the position data of the borderline of the earth unloading area and the data indicating the arrangement intervals of the target earth unloading points.

14. The vehicle guidance device according to claim 12, wherein:

the earth unloading area data input means comprises means for inputting position data of an entrance point and an exit point of the earth unloading area; and the traveling course generating means generates sequentially for each of the target points data of the traveling course, which is routed to pass the entrance point of the earth unloading area to reach the first target earth unloading point in the earth unloading area and to pass the exit point of the earth unloading area so not to pass the target earth unloading points on the previously generated traveling course, according to the position data of the entrance point and the exit point of the earth unloading area.

* * * * *